(12) United States Patent
Osborn et al.

(10) Patent No.: US 7,163,152 B2
(45) Date of Patent: Jan. 16, 2007

(54) PROTECTIVE CONTAINER FOR READABLE CARDS

(76) Inventors: Warren R. Osborn, 4290 Vintage Cir., Provo, UT (US) 84604; Bryan P. Dunford, 598 N. 100 West #13, Provo, UT (US) 84601

( * ) Notice: Subject to any disclaimer, the term of this patent is extended or adjusted under 35 U.S.C. 154(b) by 0 days.

(21) Appl. No.: 11/015,326

(22) Filed: Dec. 15, 2004

(65) Prior Publication Data

US 2006/0124748 A1 Jun. 15, 2006

(51) Int. Cl.
*G06K 7/00* (2006.01)
*G06K 19/00* (2006.01)

(52) U.S. Cl. ........................ 235/486; 235/487

(58) Field of Classification Search ............... 235/486, 235/487, 492; 206/307
See application file for complete search history.

(56) References Cited

U.S. PATENT DOCUMENTS

| | | | | |
|---|---|---|---|---|
| 5,005,106 A | * | 4/1991 | Kiku | 361/818 |
| 5,878,878 A | * | 3/1999 | Wu | 206/307 |
| 5,941,375 A | * | 8/1999 | Kamens et al. | 206/38 |
| 6,121,544 A | * | 9/2000 | Petsinger | 174/35 R |
| 6,276,944 B1 | * | 8/2001 | Klatt | 439/76.1 |
| 6,315,205 B1 | * | 11/2001 | Bates, III | 235/479 |

FOREIGN PATENT DOCUMENTS

| | | | |
|---|---|---|---|
| EP | 312067 A2 | * | 4/1989 |
| JP | 02004687 A | * | 1/1990 |

* cited by examiner

*Primary Examiner*—Thien M. Le
*Assistant Examiner*—April A. Taylor
(74) *Attorney, Agent, or Firm*—Angus C. Fox, III

(57) ABSTRACT

A protective container is provided for a magnetic card, such as a gift card or credit card, which shields the enclosed card from potentially damaging magnetic fields, thereby greatly reducing the possibility that information stored on the card will be erased. A preferred embodiment container having high magnetic permeability is stamped from metal containing nickel and iron. Other embodiments of the container, which provide less protection from unwanted magnetic fields, are stamped from mild steel. The protective container may take a variety of shapes and may include an injection molded or vacuum-formed plastic insert which retains the stored card in a preferred position. A protective container preferably has a lid which provides a full surround enclosure. The lid may be of a slide-on, press-on, or hinged type.

10 Claims, 8 Drawing Sheets

PROTECTIVE CONTAINER FOR READABLE CARDS

BACKGROUND OF THE INVENTION

1. Field of the Invention

The invention relates generally to protective containers for storing and carrying magnetic cards, such as gift cards and credit cards and, more particularly to containers for magnetically shielding one or more cards stored therein, thereby preventing information on the card from being erased by strong magnetic and electromagnetic fields.

2. History of the Prior Art

Magnetic shielding prevents magnetic fields from reaching areas where they would otherwise cause magnetic interference or magnetic erasures. Magnetic shielding may be used around either the source of magnetic interference, to prevent electromagnetic radiation from leaving the source, or more typically, around a sensitive device, to prevent the electro magnetic interference from affecting operation of the sensitive device.

Permeability refers to a material's ability to attract and conduct magnetic lines of flux. The more conductive a material is to magnetic fields, the higher its permeability. Saturation is the limiting point of a material to conduct additional magnetic lines of flux. The saturation and permeability characteristics of a material are inversely related, therefore the higher a material's permeability, the lower its saturation point. Attenuation is a ratio used to measure the effectiveness of a given shield. Only magnetic materials are permeable. Non-magnetic materials—such as glass and wood—that allow magnetic lines of force to pass through them, are nonpermeable.

Unlike light in the visible spectrum, a magnetic field cannot be blocked or reflected; it can only be redirected. The use of shielding made of special shielding alloys possessing high permeability is the most effective way to redirect a magnetic field. These special alloys work by being attracted to the magnetic field, serving as a path for magnetic lines of flux so that they are diverted to the shielding material itself, thereby greatly reducing the strength of the magnetic field. It is important that the magnetic shielding offers a complete path for the magnetic field lines, so that they do not exit the material in a place where they will cause unintended interference or erasures. The most effective shielding alloys are about 80% nickel and 15% iron by weight, with the balance being copper, molybdenum or chromium, depending on the recipe being used. Mumetal®, CO-NETIC AA® and NETIC S3-6® are trademarks for alloys which have high magnetic permeability and provide magnetic field attenuation when used as magnetic shields.

Closed shapes are the most efficient for magnetic shielding. In buildings, the wall, floor and/or ceiling areas may have magnetic shielding panels applied to intercept the magnetic interference before it enters sensitive areas. These room-sized shields must have a relatively large area in order to prevent magnetic fields from coming around them. Unlike some waves, magnetic fields do not travel in straight lines, but are in loops, starting from the magnetic radiation source and eventually returning there. Although shield calculation formulas do exist, they are usually valid only for theoretical conditions of closed shield shapes and well-described interference fields.

Credit cards typically have a stripe which incorporates a thin layer of ferromagnetic particles. Information can be "written" on the card by selectively magnetizing regions of the ferromagnetic layer. Likewise, the card can be read by scanning the ferromagnetic layer and decoding the selectively magnetized regions. Unfortunately, when the entire card is subjected to a strong magnetic field, all information within the ferromagnetic layer will be erased.

Smart cards having an embedded integrated circuit are also becoming popular. A typical smart card incorporates a radio-frequency identification (RFID) tag. An RFID tag is usually a passive (having no on-board power source, such as a battery) and generally includes an antenna and an application specific integrated circuit (ASIC). The RFID tag receives its operational energy from a reader device, which must be in close proximity. Within what is termed the surveillance zone, the reader generates sufficient power to excite, or interrogate, the RFID tag. When radio frequency energy emanating from the reader antenna impinges on the tag, a current is induced in tag antenna. This induced current is routed to the ASIC, which then performs an initialization sequence. When the reader ceases transmitting its energy transmitting interrogation signal, the ASIC begins to broadcast its identity and any other requested information over the tag antenna. The tag transmission process utilizes low-energy transmission technology that selectively reflects the electromagnetic energy back to the reader at the same fundamental frequency as it was received, using the tag antenna as an energy radiator. The transmit/receive frequency employed is generally application dependent. Commonly available proximity interrogation systems operate at frequencies in a range of 60 kHz to 5.8 GHz, and typically employ frequency modulation for data transmission. Information reflected by the tag 102 is decoded by the reader 101. RFID tags can also incorporate memory (64 kilobytes of memory is now common), which can be of a read-only type or of a read and write type. In any case, the circuitry on an RFID tag is sensitive to both static electricity and strong magnetic fields. Static electricity can have voltage levels of thousands of volts—enough to fry the delicate components in an integrated circuit which typically have operating voltages of less than 5 volts. U.S. Pat. No. 6,553,481 describes a smart card having on-board memory. This patent is hereby incorporated by reference into this application.

What is needed is a protective case which protects credit cards and smart cards from strong stray magnetic fields and static electricity.

SUMMARY OF THE INVENTION

A primary object of the present invention is to provide a protective storage and carrying case for credit cards, including gift cards, and smart cards, which have either magnetically-coded information stored thereon or a querryable integrated circuit, such as a radio-frequency identification tag. The case is designed to protect the enclosed card from strong magnetic fields and from static electricity which could either erase information that is magnetically encoded on a magnetic card, or destroy integrated circuitry on a smart card.

A secondary object of the present invention is to provide a protective case that can also be used as a gift box for the gift card, credit card or smart card.

The present invention provides several embodiments of a protective storage and carrying case for gift cards, credit cards and smart cards. The storage and carrying case is fabricated from a ferromagnetic sheet metal, such as mild steel, or a metal alloy having enhanced magnetic permeability containing nickel and iron. Each of the several embodiments is a fully closeable two-part container having either a press-on lid or a slide-on lid. For one preferred embodiment of the credit card protective case, a magnetically nonpermeable, vacuum-formed polymeric plastic insert is installed in one of the container pieces. The insert has a recess for the stored card, and at least two tabs which retain the card within the recess. The recess prevents the card from contacting the metal portion of the protective case, and thereby prevents magnetic lines of force from being diverted from the metal portion to the magnetic particles on the card. For another preferred embodiment, the inner surfaces of the protective case are coated with a magnetically nonpermeable material. The material may be cloth or felt, a polymeric plastic coating, or a plasma deposited dielectric material, which may include ceramics, non-ferrous oxides. Thus, the protective case is designed to greatly reduce the possibility that magnetically encoded information will be erased from the enclosed card. In addition, the protective case also protects sensitive integrated circuits from static electrical discharges by providing what is essentially a Faraday cage around the card.

BRIEF DESCRIPTION OF THE DRAWINGS (PHOTOGRAPHS)

DETAILED DISCLOSURE OF THE INVENTION

The present invention provides several embodiments of a protective storage and carrying case for gift cards, credit cards and smart cards. The storage and carrying case is fabricated from a ferromagnetic sheet metal, such as mild steel, or a metal alloy having enhanced magnetic permeability containing nickel and iron, and is designed to protect an enclosed card from magnetic fields and static electrical discharges. For optimum protection from stray magnetic fields, the metal alloy may have about 80% nickel and 15% iron by weight, with the balance being copper, molybdenum or chromium. Each of the several embodiments is a fully closeable two-part container having either a press-on lid or a slide-on lid. Each of the preferred embodiments will now be described with reference to the attached drawing figures.

Figure 1:
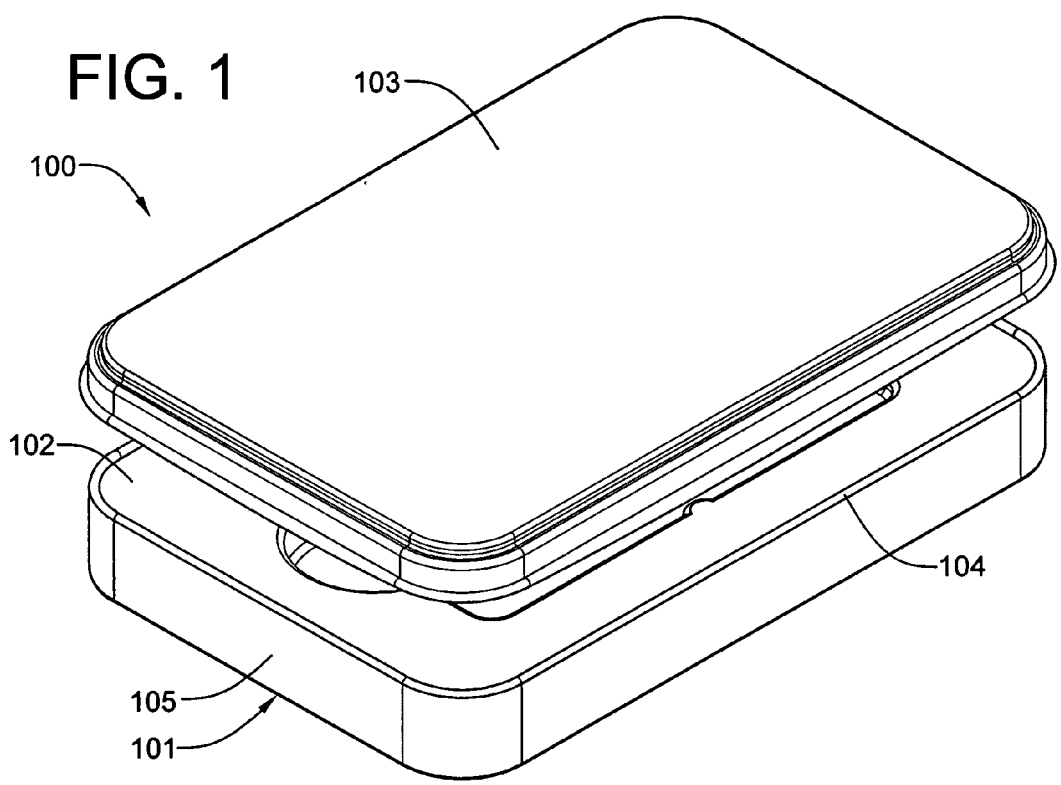
FIG. 1 is an isometric top/side view of a first embodiment protective case having a receptacle, an insert, and a press-on lid.

Referring now to FIG. 1, a first embodiment protective case 100 includes a receptacle 101, a polymeric plastic insert 102, and a press-on friction-fit lid 103. It will be noted that the insert 102 snaps into the receptacle 101, and is held in place by a first bead 104 on an upper edge of the side wall 105 of receptacle 101. The polymeric plastic insert 102 may formed using one of several readily available techniques, such as vacuum forming or injection molding. The polymeric plastic insert formed from any of a variety of thermoplastic or thermosetting resins, which may include polystyrene, ABS, polyvinylchloride, acrylic or polycarbonate.

Figure 2:
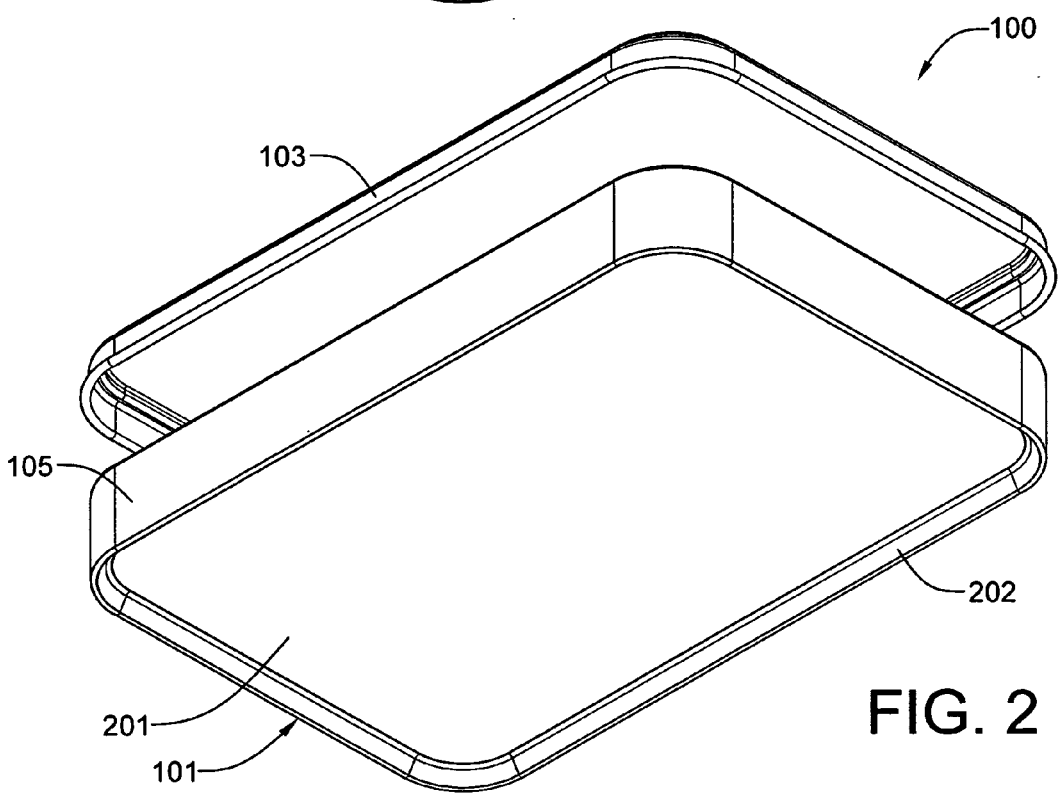
FIG. 2 is an isometric bottom/side view os the first embodiment protective case of FIG. 1.

Referring now to FIG. 2, the first embodiment protective case 100 is seen from a different angle. For this particular first embodiment protective case 100, the lid 103 is stamped and formed from a single piece of sheet metal. The receptacle 101 is formed from two pieces: a first piece for the side wall 105, and a second piece for the bottom panel 201. The bottom panel 201 is retained by a second bead 202 on a lower edge of the side wall 105 and by the insert 102, which is retained by the first bead 104.

Figure 3:
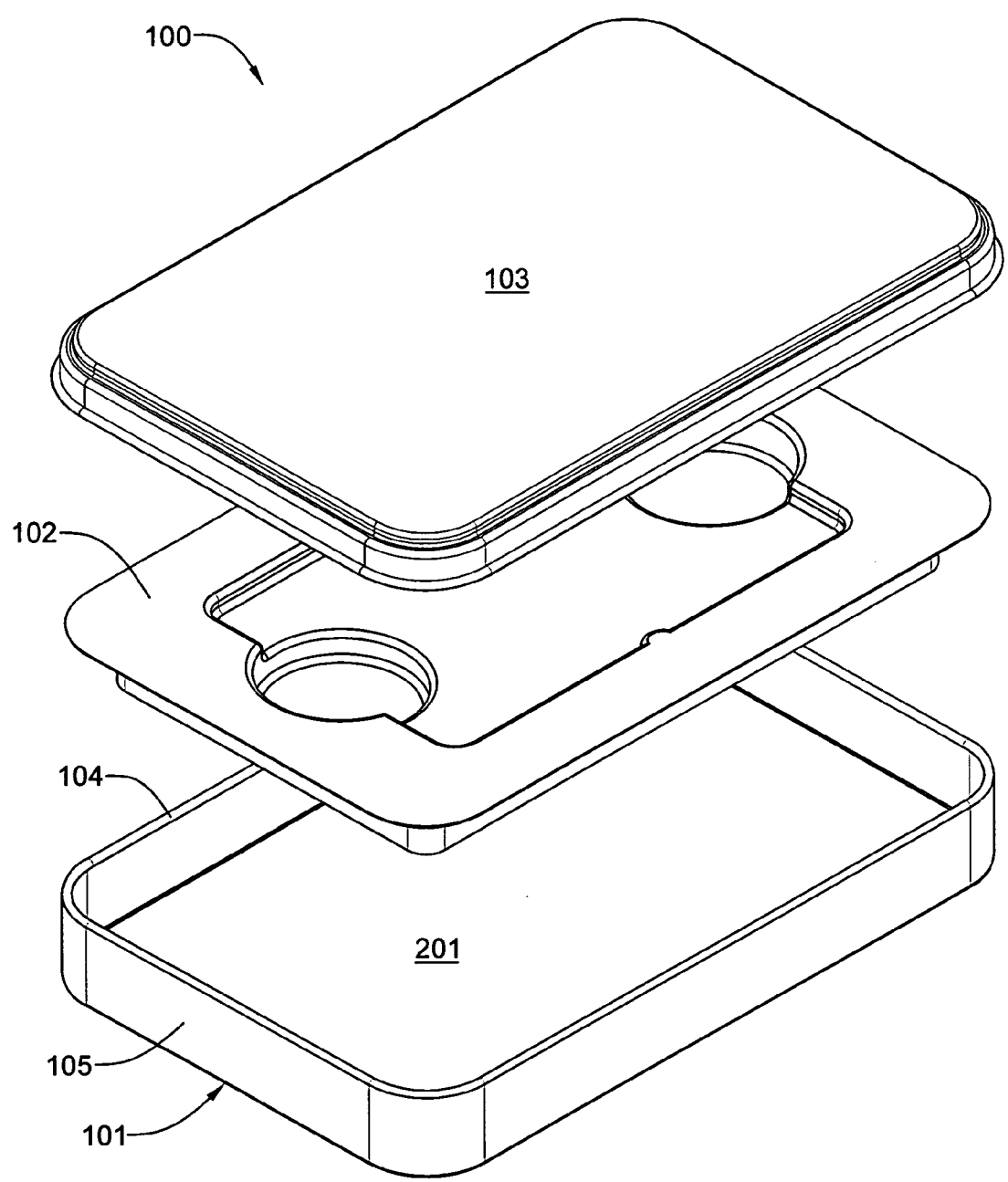
FIG. 3 is an exploded top/side view of the first embodiment protective case of FIG. 1.

Referring now to FIG. 3, this exploded view of the first embodiment protective case 100 from above shows the interior of the receptacle 101 and greater detail of the insert 102.

Figure 4:
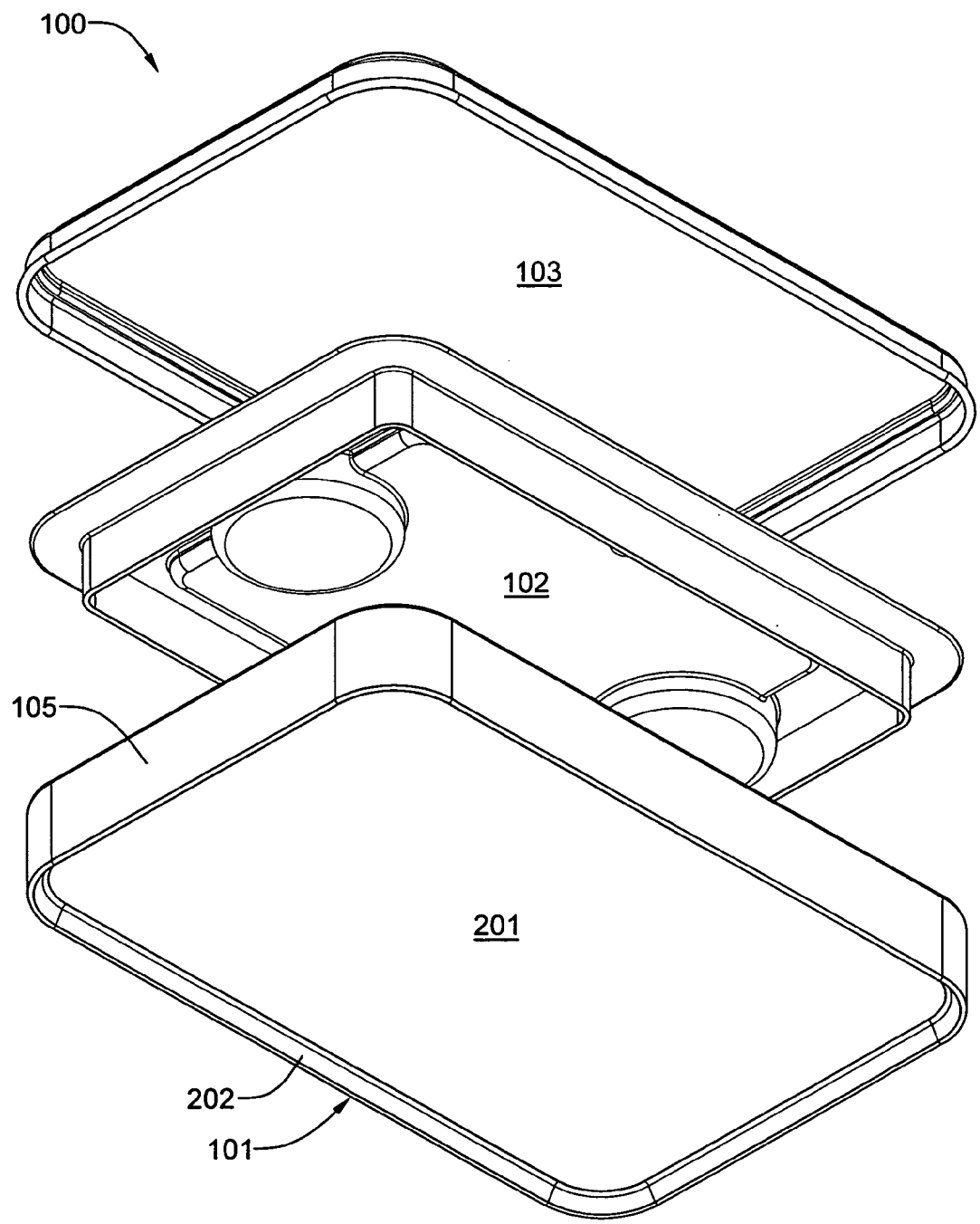
FIG. 4 is an exploded bottom/side view of the first embodiment protective case of FIG. 1.

Referring now to FIG. 4, this exploded view of the first embodiment protective case 100 from below show additional details of the insert 102.

Figure 5:
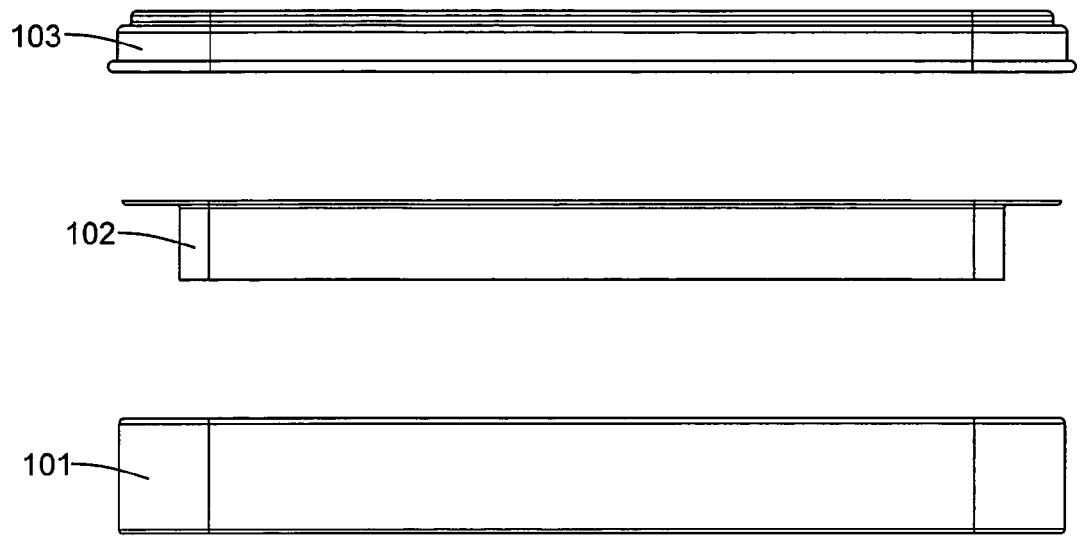
FIG. 5 is an exploded side elevational view of the first embodiment protective case of FIG. 1.
Figure 6:
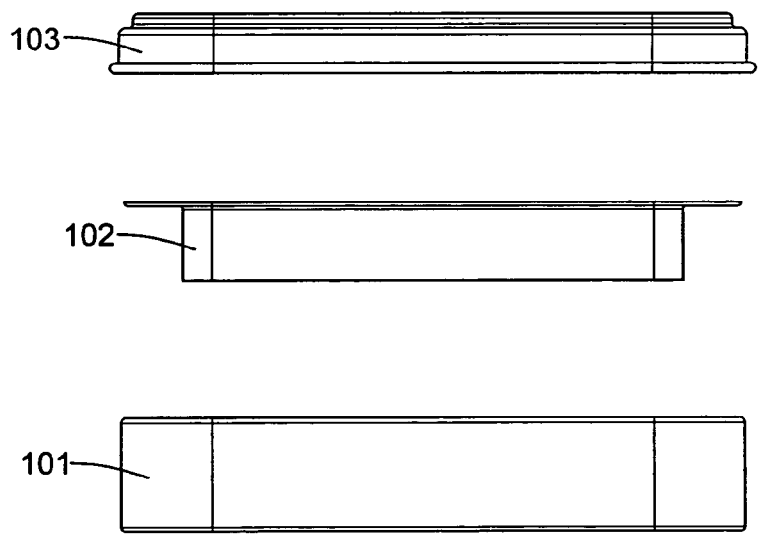
FIG. 6 is an exploded end elevational view of the first embodiment protective case of FIG. 1.

Referring now to FIGS. 5 and 6, these exploded side and end elevational views provide excellent profile views of the lid 103.

Figure 7:
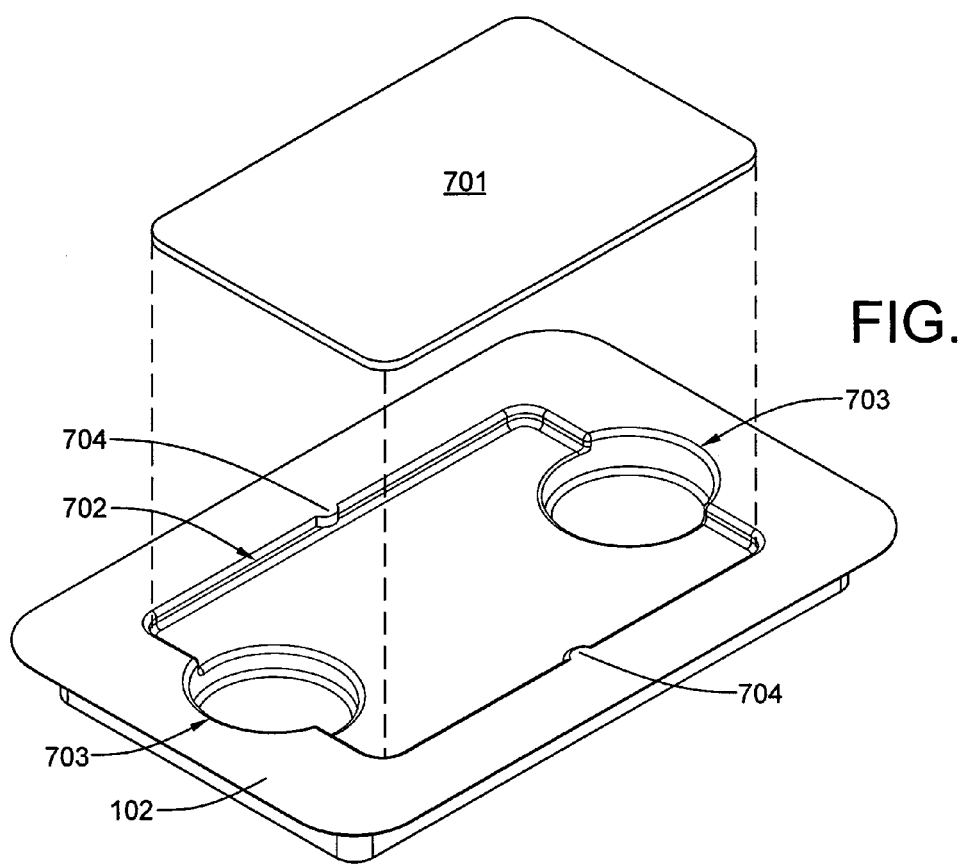
FIG. 7 is an isometric view of a card to be inserted with the recess of the insert of the first embodiment protective case of FIG. 1.

Referring now to FIG. 7, a card 701 is to be inserted with the recess 702 of the insert 102 of the first embodiment protective case 100. It will be noted that a finger depression 703 is positioned at each end of the recess 702, which enable the owner of the card 701 to easily remove it from the recess 702. It will be further noted that a tab 704 on either side of the recess 702 secured the card within the recess 702 and prevents it from touching the lid 103. As the insert 102 is preferably made from semi-flexible polymeric material, the insert 102 can be distorted sightly to release the card from the tabs 704.

Figure 8:
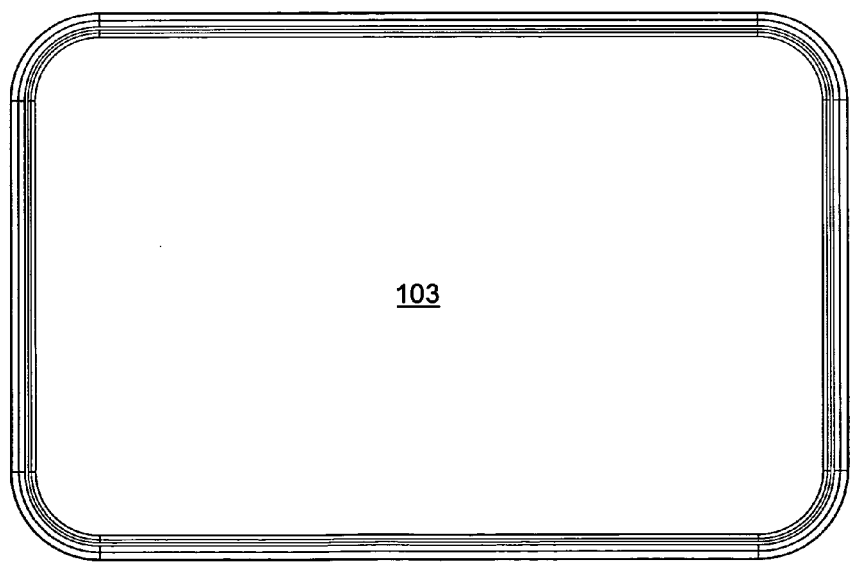
FIG. 8 is a top plan view of the press-on lid of the first embodiment protective case of FIG. 1.

Referring now to FIG. 8, this top view of the press-on lid 103 of the first embodiment protective case 100 shows the decorative stamping 801 around the perimeter of the lid 103.

Figure 9:
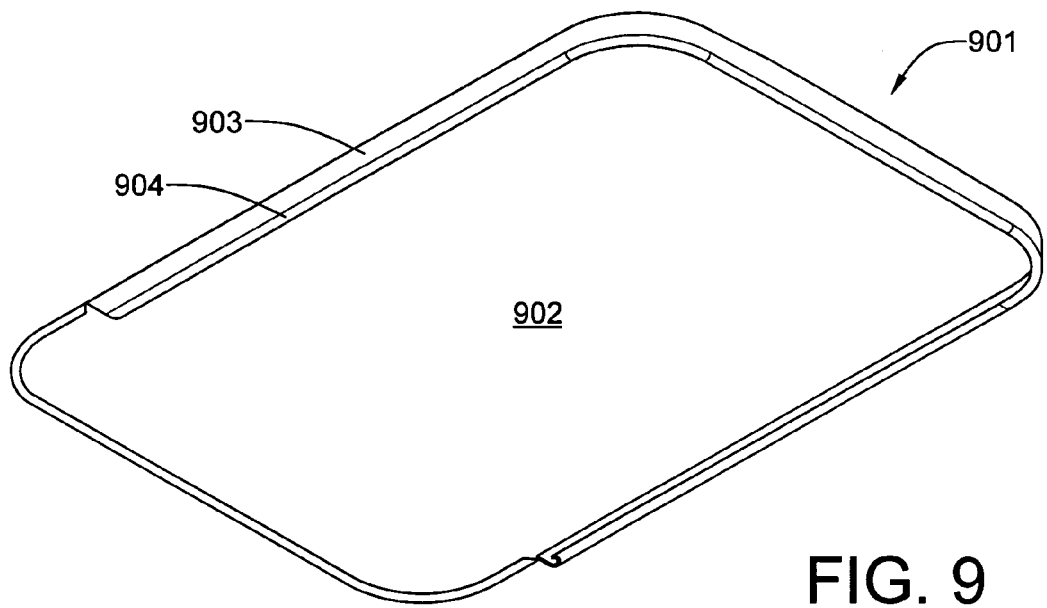
FIG. 9 is a bottom/side isometric view of the slide on lid of a second embodiment protective case.

Referring now to FIG. 9, this view from below of a slide-on lid 901 of a second embodiment protective case is shown. It will be noted that the slide-on lid 901 is stamped from a single piece of sheet metal and includes an upper panel 902, a U-shaped side panel 903, and a first retention bead 904 along the bottom edge of the U-shaped side panel 903.

Figure 10:
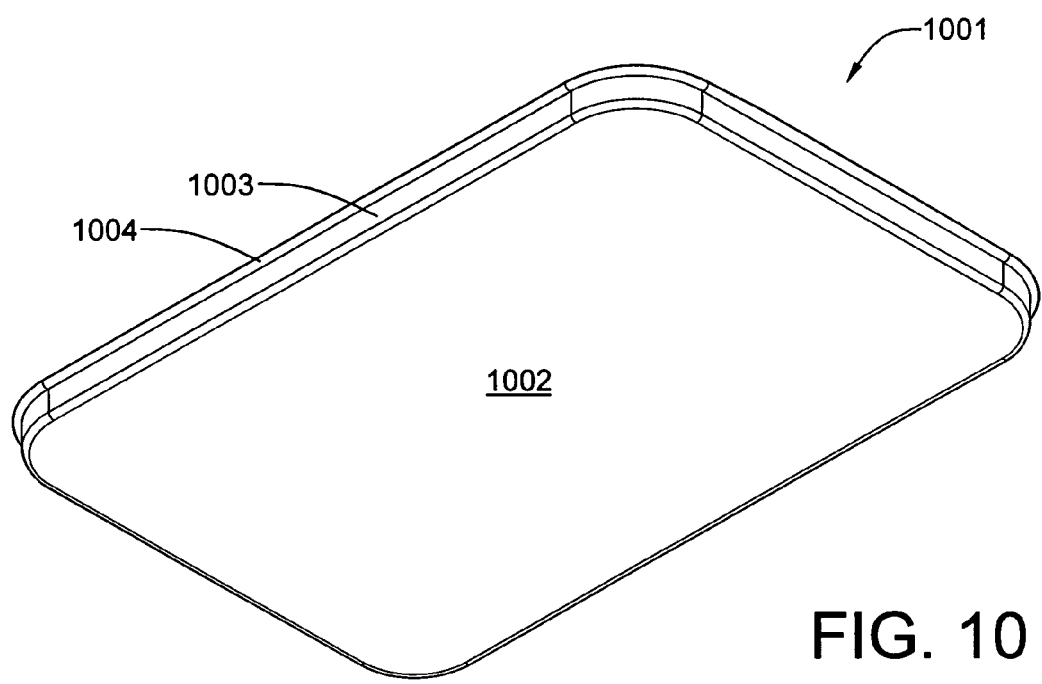
FIG. 10 is a bottom/side isometric view of the receptacle of the second embodiment protective case.

Referring now to FIG. 10, this view from below of the receptacle 1001 of the second embodiment protective case is shown. The receptacle 1001 is also stamped from a single piece of sheet metal, and has a bottom panel 1002, a perimetric side panel 1003, and a second retention bead 1004 on and continuous with the upper edge of the perimetric side panel 1003.

Figure 11:
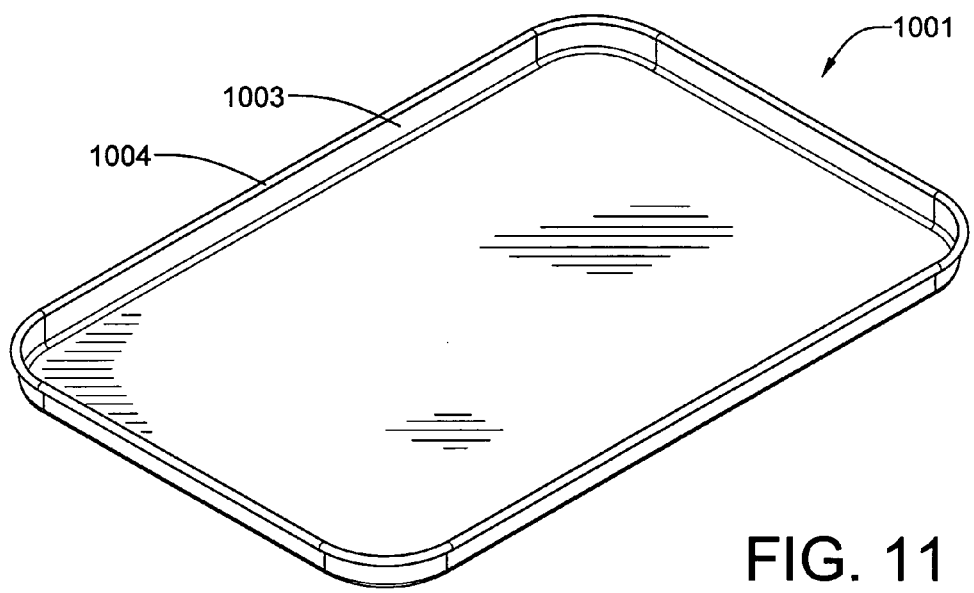
FIG. 11 is a top/side isometric view of the receptacle of the second embodiment protective case.

Referring now to FIG. 11, this view from above of the receptacle 1001 of the second embodiment protective case shows the interior 1101 thereof, in which a card may be placed.

Figure 12:
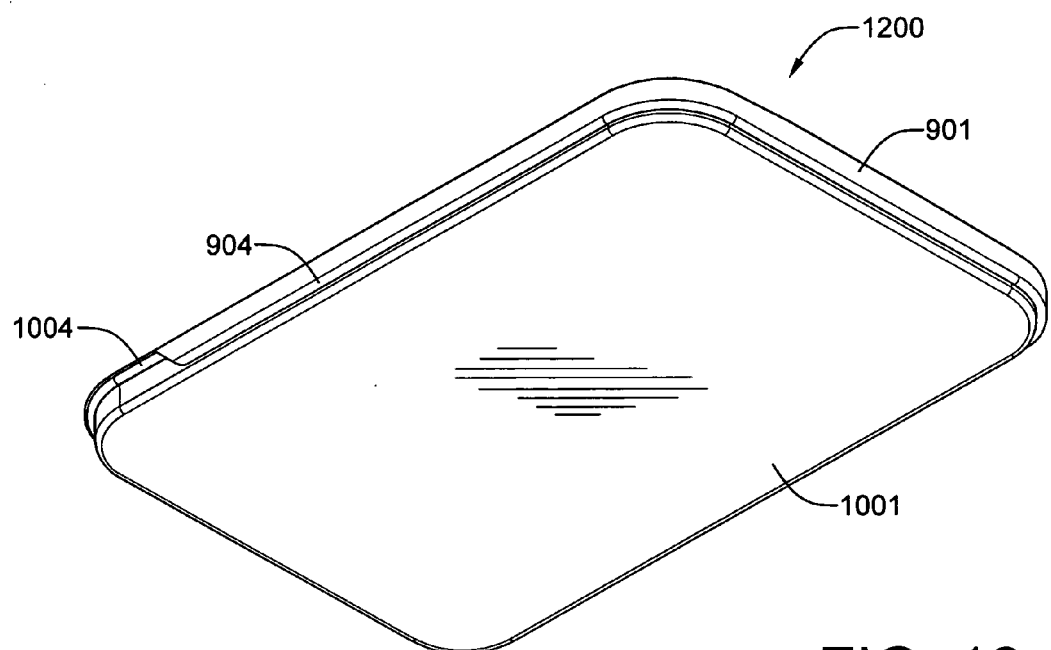
FIG. 12 is a bottom/side isometric view of a closed second embodiment protective case showing the lid slid over the receptacle thereof.

Referring now to FIG. 12, the slide-on lid 901 of FIG. 9 and the receptacle 1001 of FIGS. 10 and 11 have been assembled by sliding the lid 901 over the receptacle 1001 so that the second retention bead 1004 is trapped between the first retention bead 904 and the upper panel 902 of the slide-on lid 901. The result is a complete second embodiment protective case 1200.

Figure 13:
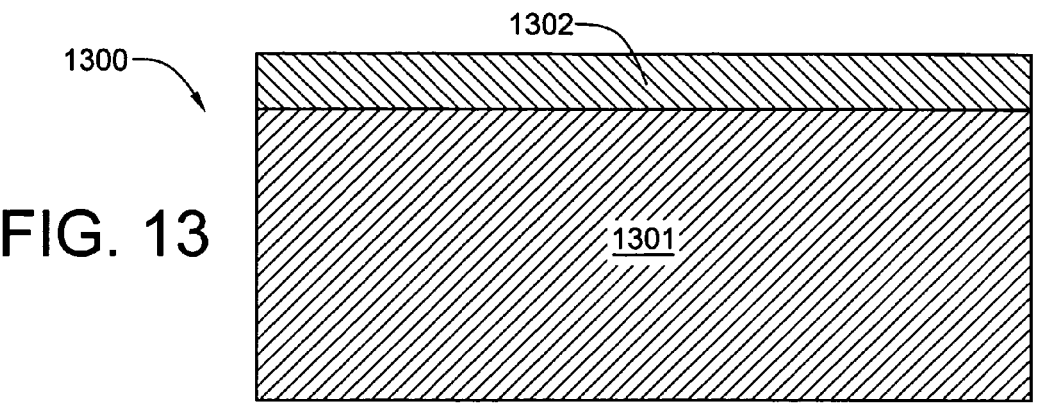
FIG. 13 is a cross-sectional view of a portion of oxide-coated sheet metal used to fabricate the second embodiment protective case.

Referring now to the protective case material 1300 of FIG. 13, sheet metal 1301 has an oxide layer 1302 that has been deposited thereon via chemical vapor deposition, deposited thereon plasma deposition or grown thereon.

Figure 14:
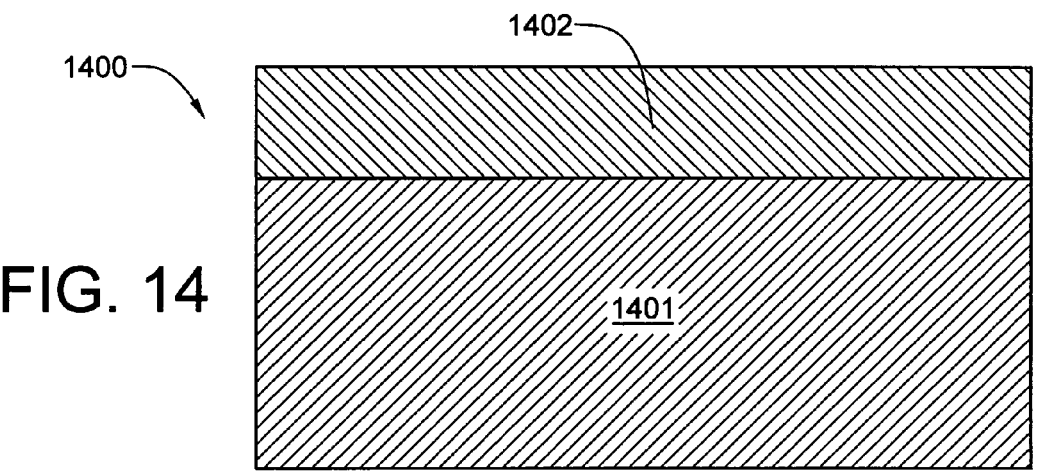
FIG. 14 is a cross-sectional view of a portion of sheet metal having a polymeric coating used to fabricate the second embodiment protective case.

Referring now to the protective case material of FIG. 14, sheet metal 1401 has been coated with a polyermic, paint or varnish layer 1402 using any one of the processes that are commercially available.

Figure 15:
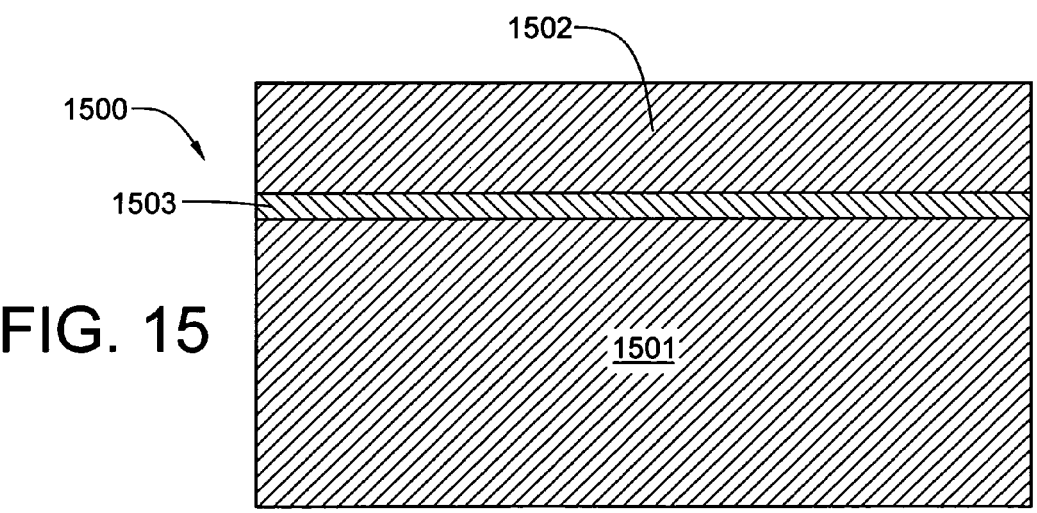
FIG. 15 is a cross-sectional view of a portion of sheet metal having a dielectric layer bonded thereon.

Referring now to the protective case material of FIG. 15, sheet metal 1501 has been bonded to a dielectric layer 1502, such as paper, using an adhesive layer 1503.

Although only several embodiments of the present invention has been disclosed herein, it will be obvious to those having ordinary skill in the art that changes and modifications may be made thereto without departing from the scope and spirit of the invention as hereinafter may be claimed.

What is claimed is:

1. A protective case for storing a readable card, said protective case comprising:
    a receptacle formed from no more than two pieces of ferromagnetic metal;
    a lid formed from a single piece ferromagnetic metal, said receptacle and said lid forming a closed container; and
    means for retaining a card stored within the protective case so that said card is not in direct contact with the ferromagnetic metal of either said receptacle or said lid, wherein said means for retaining is a dielectric coating on the inner surfaces of said receptacle and on said lid which prevent the stored card from coming in direct contact with the metal.

2. The protective case of claim 1, wherein said dielectric coating is selected from the group consisting of dielectric metal oxides, silicon dioxide, polymeric films, paints, varnishes, and paper.

3. The protective case of claim 1 wherein said readable card has a laminar polymeric substrate having a querryable embedded integrated circuit chip.

4. A protective case for storing a readable card having a laminar polymeric substrate and incorporating a readable magnetizable strip, said protective case comprising:
    a receptacle formed from no more than two pieces of ferromagnetic metal;
    a lid formed from a single piece ferromagnetic metal, said receptacle and said lid forming a closed container; and
    means for retaining a card stored within the protective case so that said card is not in direct contact with the ferromagnetic metal of either said receptacle or said lid.

5. In combination with a readable card having a laminar polymeric substrate, a protective case comprising:
    a receptacle formed from no more than two pieces of ferromagnetic metal;
    a lid formed from a single piece of ferromagnetic metal, said receptacle and said lid forming an entirely closed container; and
    means for retaining a card stored within the protective case so that said card is not in direct contact with the ferromagnetic metal of either said receptacle or said lid, wherein said means for retaining is a dielectric coating on the inner surfaces of said receptacle and on said lid which prevent the stored card from coming in direct contact with the metal.

6. The combination of claim 5, wherein said dielectric coating is selected from the group consisting of dielectric metal oxides, silicon dioxide, polymeric, films paints, varnishes, and paper.

7. The combination of claim 5, wherein said laminar polymeric substrate incorporates a querryable embedded integrated circuit chip.

8. In combination with a readable card having a laminar polymeric substrate incorporating a readable magnetizable strip, a protective case comprising:
    a receptacle formed from no more than two pieces of ferromagnetic metal;
    a lid formed from a single piece of ferromagnetic metal, said receptacle and said lid forming an entirely closed container; and
    means for retaining a card stored within the protective case so that said card is not in direct contact with the ferromagnetic metal of either said receptacle or said lid.

9. A protective case for storing a readable card, said protective case comprising:
    a receptacle formed from no more than two pieces of ferromagnetic metal;
    a lid formed from a single piece ferromagnetic metal, said receptacle and said lid forming a closed container; and
    a polymeric plastic insert within said receptacle for retaining a card stored within the protective case so that said card is not in direct contact with the ferromagnetic metal of either said receptacle or said lid, said insert having:
        a generally rectangular recess sized to receive said readable card;
        at least one tab positioned on each of two opposing sides of said rectangular recess, each tab projecting from an upper portion of said rectangular recess and serving to retain said readable card within said rectangular recess;
        at least one finger depression positioned along a side of said rectangular recess, said finger depression enabling said readable card to be removed from said rectangular recess; and
        wherein said insert is retained within said receptacle by a bead formed along an upper edge of said receptacle.

10. In combination with a readable card having a laminar polymeric substrate, a protective case comprising:
    a receptacle formed from no more than two pieces of ferromagnetic metal;
    a lid formed from a single piece of ferromagnetic metal, said receptacle and said lid forming an entirely closed container; and
    a polymeric plastic insert within said receptacle for retaining a card stored within the protective case so that said card is not in direct contact with the ferromagnetic metal of either said receptacle or said lid, said insert having:
        a generally rectangular recess sized to receive said readable card;
        at least one tab positioned on each of two opposing sides of said rectangular recess, each tab projecting from an upper portion of said rectangular recess and serving to retain said readable card within said rectangular recess;

at least one finger depression positioned along a side of said rectangular recess, said finger depression enabling said readable card to be removed from said rectangular recess; and wherein said insert is retained within said receptacle by a bead formed along an upper edge of said receptacle.

* * * * *